United States Patent
Cook et al.

(10) Patent No.: US 6,938,517 B2
(45) Date of Patent: Sep. 6, 2005

(54) POWER TRANSFER UNIT

(75) Inventors: Dennis Cook, Royal Oak, MI (US); Jonathan Adler, Ann Arbor, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 185 days.

(21) Appl. No.: 10/439,831

(22) Filed: May 16, 2003

(65) Prior Publication Data

US 2004/0226766 A1 Nov. 18, 2004

(51) Int. Cl.[7] ................................................. F01M 1/00
(52) U.S. Cl. ................................... 74/606 R; 184/6.25
(58) Field of Search ........................... 74/606 R, 730.1; 184/6.25; 55/418; 210/223, 168

(56) References Cited

U.S. PATENT DOCUMENTS

| | | | | |
|---|---|---|---|---|
| 2,392,313 A | * | 1/1946 | Dahlstrand | .................... 74/420 |
| 5,009,779 A | * | 4/1991 | Hebert | ........................ 210/223 |
| 5,294,350 A | * | 3/1994 | Murphy et al. | ............. 210/168 |
| 5,902,362 A | * | 5/1999 | Paoluccio | .................... 55/418 |
| 6,626,065 B2 | * | 9/2003 | Arnold et al. | ............. 74/730.1 |
| 2003/0000877 A1 | | 1/2003 | Szalony | |
| 2004/0149519 A1 | * | 8/2004 | Slesinski | .................... 184/6.25 |

FOREIGN PATENT DOCUMENTS

| | | | | |
|---|---|---|---|---|
| EP | 0 363 257 | * | 4/1990 | ............... 74/606 R |
| EP | 1 091 162 A1 | | 4/2001 | ............... 74/606 R |

* cited by examiner

*Primary Examiner*—Vinh T. Luong
(74) *Attorney, Agent, or Firm*—Brinks Hofer Gilson & Lione

(57) ABSTRACT

A power transfer unit includes a non-parallel gear set and a parallel gear set integrally packaged within a housing. The housing includes an extension portion that connects the power transfer unit to a transmission assembly. The extension portion is formed having a structural web with one or more cavities. These cavities include inner cavities that define a portion of the interior volume of the housing and may also include outer cavities that open to the outer side of the housing. The web between cavities provides structural rigidity for the power transfer unit, while the cavities minimize the weight of the power transfer unit.

17 Claims, 4 Drawing Sheets

POWER TRANSFER UNIT

BACKGROUND

1. Technical Field

The present invention relates generally to the power train of a motor vehicle. More particularly, the present invention relates to a power transfer unit for distributing power to the rear wheels of the vehicle.

2. Background Information

In the past, most automobiles in the United States utilized a rear wheel drive power delivery scheme. In adapting these rear wheel drive schemes into four wheel drive applications, a transfer case was, and often still is, positioned at the output of the transmission assembly. When engaged, the transfer case diverts a portion of the power coming from the transmission assembly from the rear wheels to the front wheels.

Currently in the United States, a significant portion (if not a majority) of new automobiles are front wheel drive based vehicles. In a front wheel drive vehicle, both the engine and the transmission assembly are typically transversely oriented in the vehicle. By positioning the power plant and transmission assembly transversely in the vehicle, more direct coupling of the transmission assembly to the vehicle's transaxle and front wheels can be achieved.

With front wheel drive vehicles themselves becoming a mature market, a recent trend in the automobile industry has been to adapt these front wheel drive schemes for all or four wheel drive applications. This is accomplished by providing a power transfer unit that diverts a portion of the power from the front wheels to a rear wheel drive shaft and subsequently to the rear wheels.

Several criteria affect the design of power transfer units. Typically, the input portion of the power transfer unit is coupled to the output of the transmission, and the output portion of the power transfer unit is coupled to the rear wheel drive shaft. In achieving this, the power transfer unit must accommodate a certain amount of lateral offset, the lateral distance between the axis of the rear propeller shaft and the mounting face of the transmission assembly. As such, the primary components of the power transfer unit, namely, the inner gear sets, are located some distance from the transmission, which requires using an extended housing to couple the power transfer unit to the transmission.

In addition, contaminants remaining in the power transfer unit from the production of the power transfer unit and additional contaminants generated by the wear of the internal components during the operation of the unit may reduce the life of the gears and support bearings. Moreover, the gear sets, associated bearings, and the proximity of the engine, transmission and exhaust components may generate more heat than can be rejected from the main cavity or housing of the power transfer unit. In these units, additional cooling is typically required through the use of cooling fins, auxiliary liquid-air coolers, or auxiliary liquid-liquid coolers. Some units even employ a pumped heat exchanger which transfers heat from the power transfer unit to the engine coolant.

To prevent air pressure or vacuum from building within the power transfer unit, the power transfer unit must allow venting from the interior of the unit to the external atmosphere while at the same time preventing lubricant from escaping the enclosure. During the operation of some units, lubricant is occasionally atomized into droplets or churned into foam. In these units, some mechanism must be employed to separate the lubricant from the ventilated air. For instance, certain power transfer units use a separation cavity or labyrinth that allows lubricant droplets or foam to settle out of the air before the air is ventilated to the atmosphere. These cavities may be cast into the housing or formed adjacent to the vent by attaching a separate shield.

From the above, it is seen that there exists a need for an improved power transfer unit with enhanced heat rejection, contamination collection, and ventilation.

BRIEF SUMMARY

In overcoming the above mentioned and other drawbacks, the present invention provides a power transfer unit with a non-parallel gear set and a parallel gear set integrally packaged within a housing. The non-parallel gear set is coupled to the rear wheel drive line, and the parallel gear set is coupled between the non-parallel gear set and a transmission assembly. The housing includes an extension portion that mates the power transfer unit to the transmission assembly. The extension portion is formed having a structural web with one or more cavities. These cavities include inner cavities that define a portion of the interior volume of the housing and may also include outer cavities that open to the outside of the housing. The web between cavities provides structural rigidity for the power transfer unit, while the cavities minimize the weight of the power transfer unit.

A filter medium may be positioned within one or more of the inner cavities. As a lubricant lubricates the non-parallel gear set and the parallel gear set, the filter medium acts as passive type filter that removes particulates from the lubricant as it flows over the filter medium. In some embodiments, the filter medium is a fabric filter made from, for example, nylon. Alternatively, the filter medium can be a magnetic material that filters the lubricant by magnetically attracting contaminants from the lubricant.

In some configurations of the power transfer unit, cooling fins may be located within one or more of the outer cavities to enhance the heat rejection capabilities of the power transfer unit. Alternatively or additionally, cooling fins may be positioned over other parts of the exterior of the extension portion to increase the heat exchange performance of the power transfer unit.

One or more of the inner cavities may be located so as to be substantially protected from any lubricant splash. Such a cavity defines a separation chamber which allows air-suspended lubricant to settle out of the air before the air passes through a vent communicating to the ambient atmosphere.

The foregoing discussion has been provided only by way of introduction. Nothing in this section should be taken as a limitation on the following claims, which define the scope of the invention.

BRIEF DESCRIPTION OF THE DRAWINGS

The accompanying drawings, incorporated in and forming a part of the specification, illustrate several aspects of the present invention and, together with the description, serve to explain the principles of the invention. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

Figure 1:
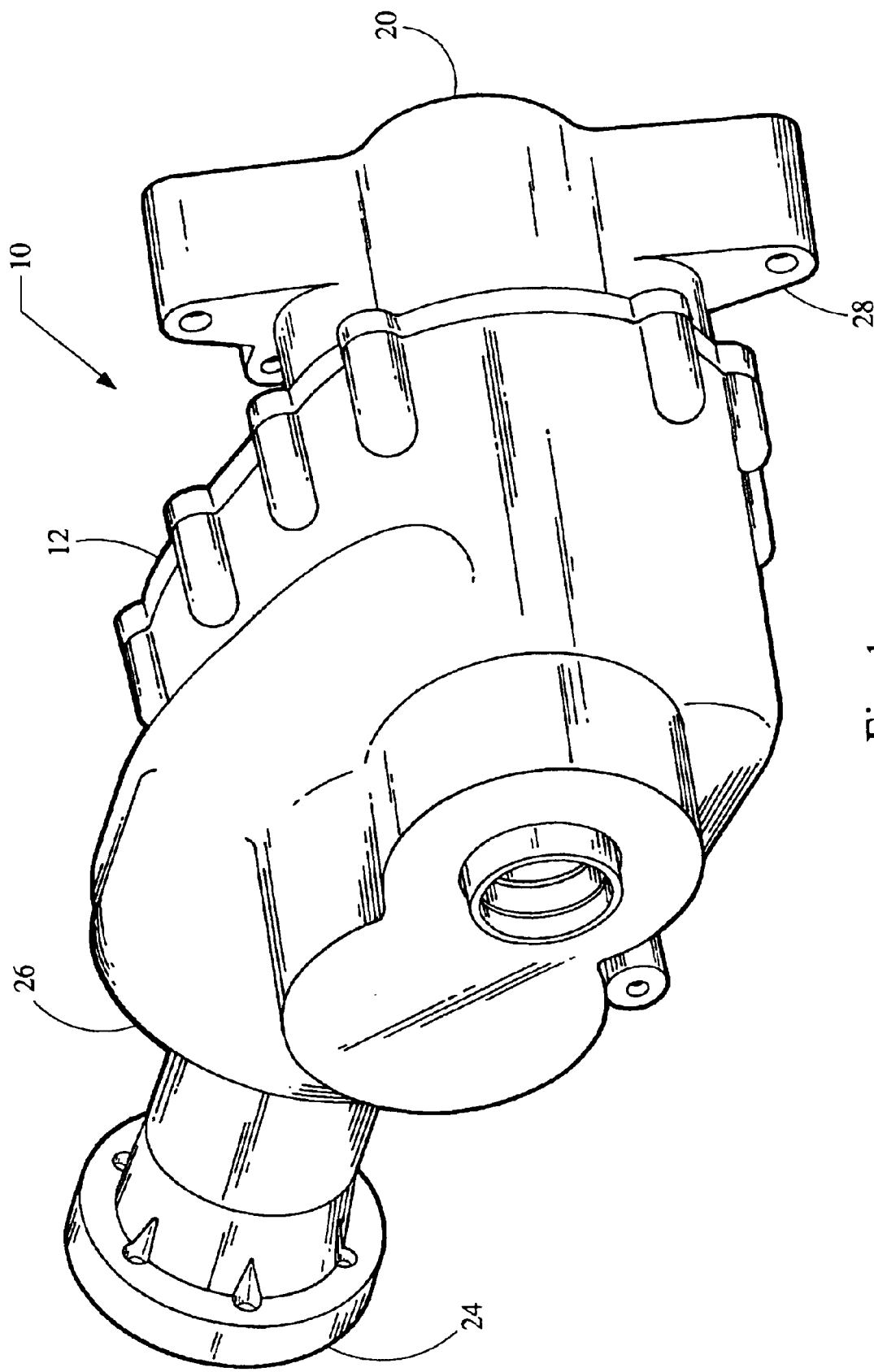
FIG. 1 is a perspective view of a power transfer unit.
Figure 2:
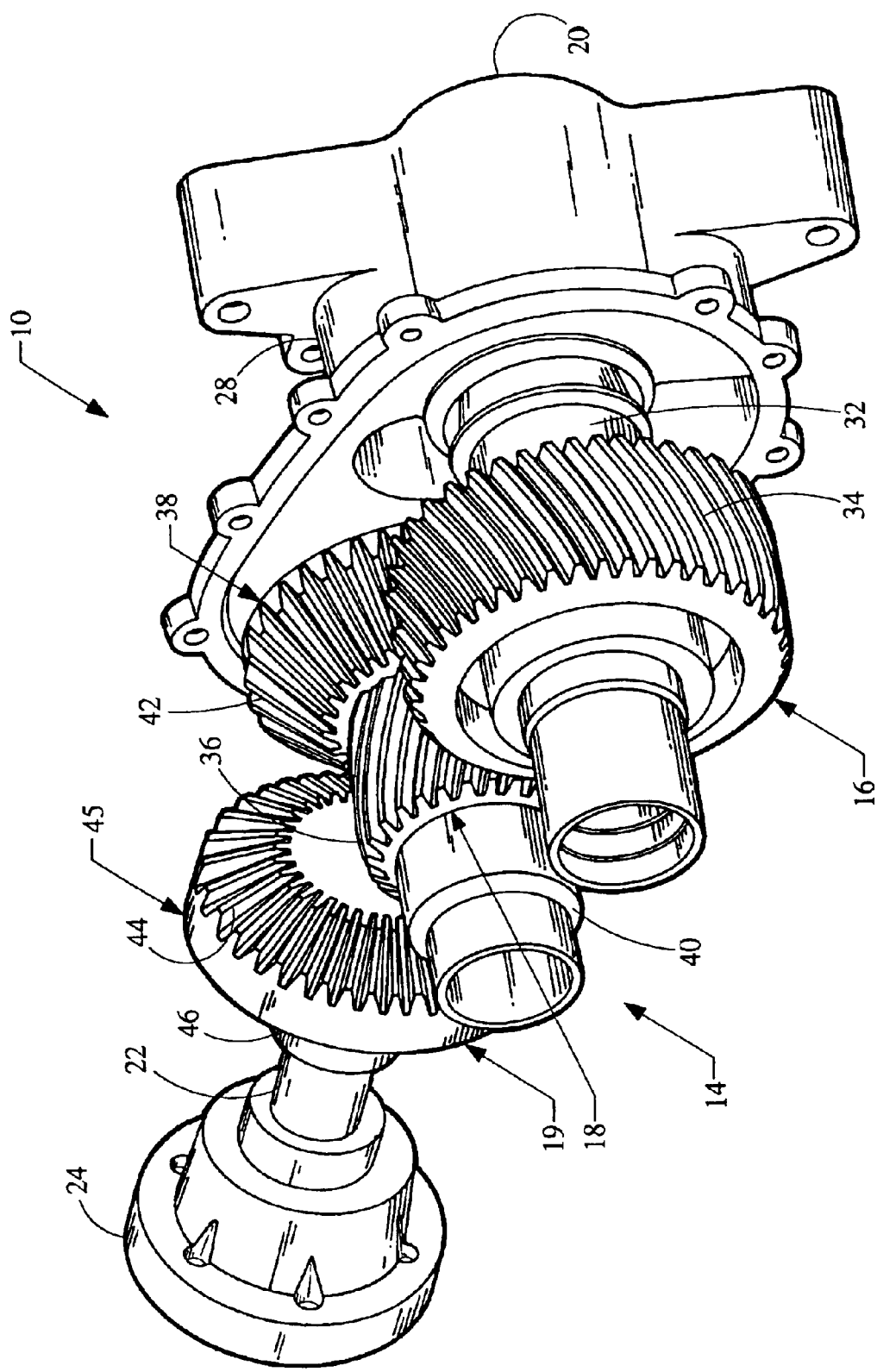
FIG. 2 is an interior view of the power transfer unit of FIG. 1 illustrating the primary components, including the lateral extension of the housing.

Referring now to the drawings, FIGS. 1 and 2 illustrate a power transfer unit 10 used for an all-wheel or four-wheel driveline, incorporating the principles of the present invention. The power transfer unit 10 includes a housing 12 in which the primary components of the unit 10 are integrally packaged. The components principally include a parallel gear set 14 of two or more gear wheels, such as a first helical gear 16 and a second helical gear 18, and a non-parallel gear set 19 of two bevel gears, such as the hypoid gears 38 and 44.

As used herein, the term "parallel gear set" is intended to refer to any mechanism (including, without limitation, mechanisms with gear wheels, mechanisms without gear wheels, gear trains, chain gears and belt systems), which transfer power from a first shaft to a second shaft, the first and second shafts defining axes that are generally parallel to one another.

As used here, the term "non-parallel gear set" is intended to refer to any mechanism (including, without limitation, mechanisms with gear wheels, mechanisms without gear wheels, gear trains, chain gears and belt systems) for transferring power from a first shaft to a second shaft; wherein the first and second shaft define axes that are not generally parallel to one another.

As mentioned above, the primary components of the power transfer unit 10 are all integrally packaged together and provided with a common housing 12. The power transfer unit 10 includes an input member 20 and an output member 22, either of which may or may not protrude from the housing 12 depending on the specific design criteria of the power transfer unit and the application in which it is being employed. Rotation from an output of the transmission assembly is coupled to the input member 20, and the output member 22 is coupled to the rear wheel driveline with an output flange 24.

The housing 12 of the power transfer unit 10 includes a casing 26 mated to a lateral extension 28, which has a transmission mounting interface 30 (FIG. 4) that connects to a mounting interface of the vehicle's transmission. The first helical gear 16 is coupled to a first shaft 32, which is in turn coupled via the input 20 to the vehicle's transmission by a splined or other engagment. Teeth 34 of the first helical gear 16 engage with teeth 36 of the helical second gear 18. The second helical gear 18 is coupled to the bevel gear or hypoid ring gear 38, through a second shaft 40, and the ring gear 38 has teeth 42 that engage with teeth 44 of the bevel gear 45. The bevel gear 45 is coupled to a third shaft 46. An end portion of the third shaft 46 is the output member 22, which is coupled to the rear wheel drive shaft through the output flange 24.

In this configuration, the power transfer unit 10 diverts a portion of the power from the front wheels of the vehicle to the rear wheel drive shaft and subsequently to the rear wheels. In particular, a portion of the power from the front wheels is transmitted as rotary motion of the first shaft 32, and hence the first helical gear 16. The cooperation between the teeth 34 of the first helical gear 16 and the teeth 36 of the second helical gear 18 transfers the power from the first shaft 32 to the second shaft 40. Because the ring gear 38 is coupled to the second helical gear 18 through the second shaft 40, cooperation between the teeth 42 of the ring gear 38 and the teeth 44 of the bevel gear 45 transfers power from the second shaft 40 to the third shaft 46. Accordingly, the power transfer unit 10 transfers power from the vehicle's transmission through the first and second shafts 32, 40 to the third shaft 46, and hence to the rear wheel draft shaft.

Figure 3:
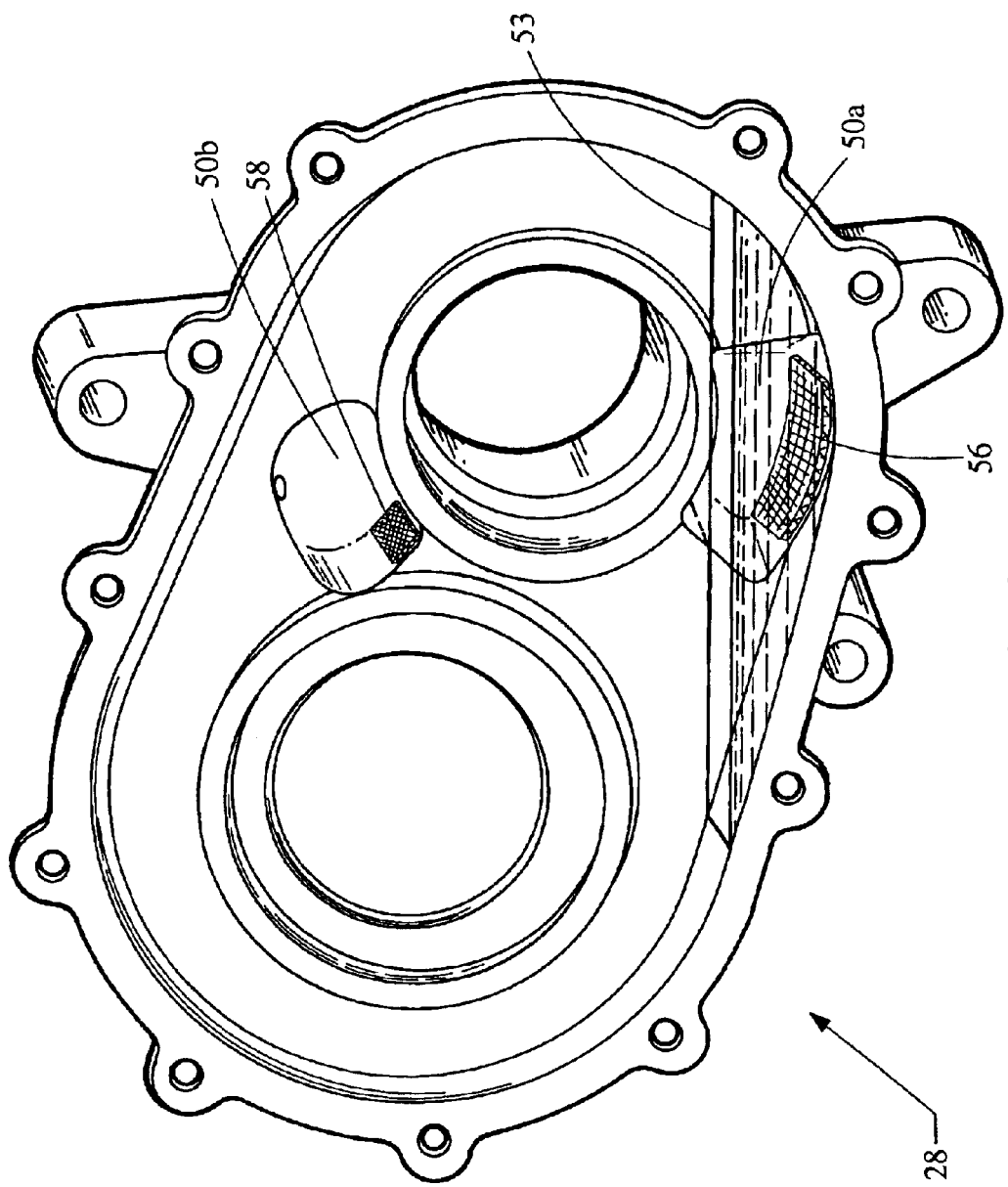
FIG. 3 depicts the inner side of the lateral extension in accordance with the invention.
Figure 4:
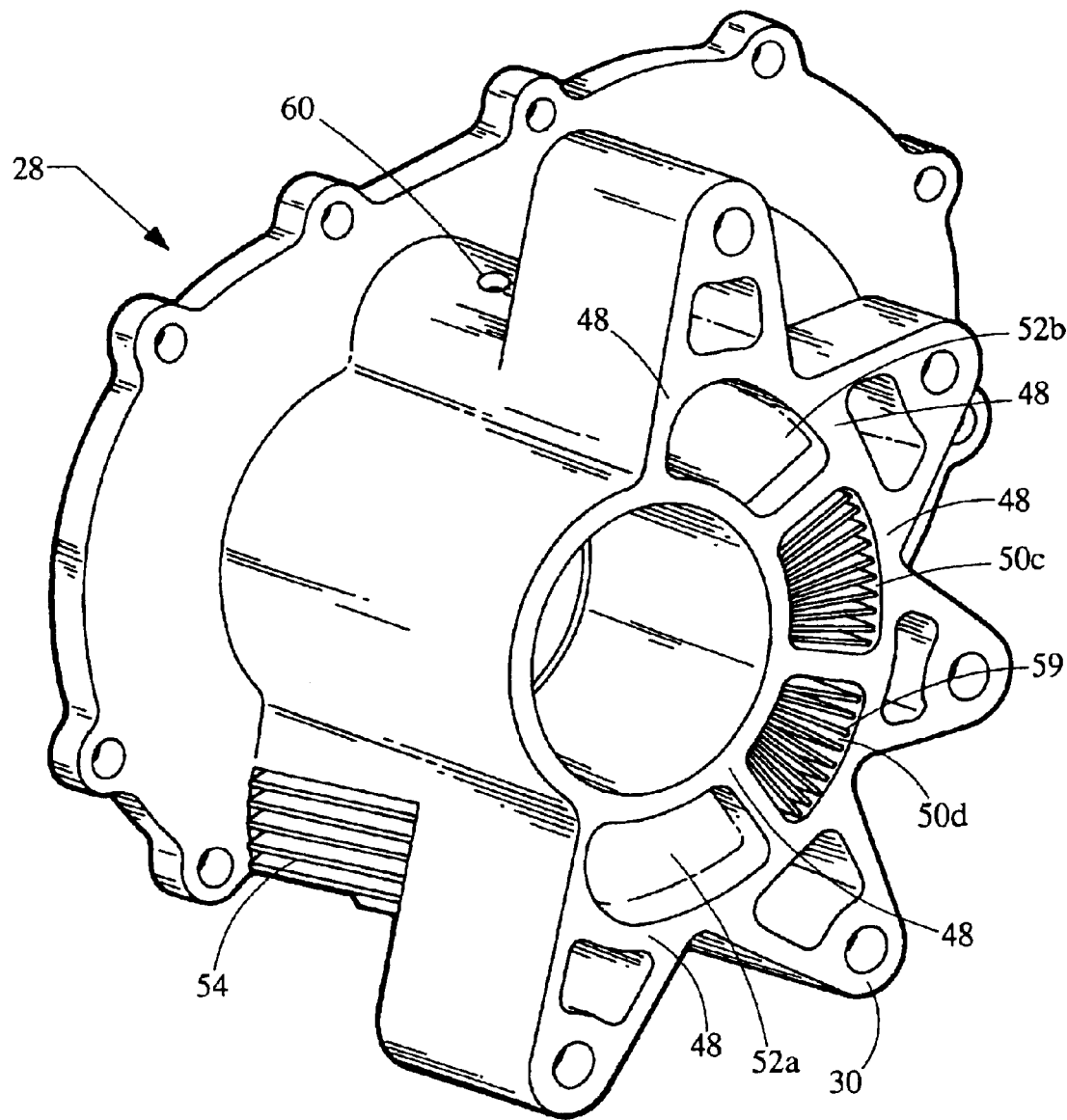
FIG. 4 depicts the outer side of the lateral extension in accordance with the invention.

Because the output member 22 must correspond with the propeller shaft of the rear wheel drive line, it is located some lateral distance away from the transmission interface 30, such that the housing 12 is a rigid body designed to resist bending and torsional loads. In particular, as shown in FIGS. 3 and 4, the lateral extension 28 includes a web structure 48 with distinct cavities 50a, 50b, 50c, 50d that provides structural rigidity, while minimizing the power transfer unit's weight. The depth of the cavities 50a, 50b, 50c, 50d are defined by the location of their respective end walls. For example, the cavities 50a, 50b are interior cavities with respective end walls 52a, 52b that are located toward and are substantially parallel to the transmission mounting interface 30. These cavities 50a, 50b open towards the primary components in the interior of the housing 12. On the other hand, the cavities 50c, 50d are outer cavities that open towards the outer side of the power transfer unit 10. Their end walls being located near or flush with the inner surface of the lateral extension 30.

Referring now in particular to the cavity 50a, its end wall 52a is located away from the primary components, such that the cavity 50a forms part of the interior volume of the power transfer unit 10. This cavity 50a is located within the sump of the interior of the housing 12 so that it remains at least partly submerged in a lubricant 53 allowing the lubricant 53 to circulate through the cavity 50a when the lubricant is churned by the gears.

The lubricant 53 flows into and out of the cavity 50a with a velocity that is less than the velocity of the lubricant that moves through the interior of the housing 12 about the first and second helical gears 16, 18 and the hypoid gear 19. The lower velocity of the lubricant in the cavity 50a allows the lubricant to reject more heat to the outer wall of the lateral extension 28, which may be provided with optional cooling fins 54 to further enhance the heat rejection capabilities of the housing 12.

In addition, a filter medium 56 may be placed within the cavity 50a, such as a flow-over or "carpet" filter, for example, as described in U.S. patent application Ser. No. 2003/0000877, filed Jan. 2, 2003, the entire contents of which are incorporated herein by reference. Alternatively, a magnet may be used as the filter medium 10 to magnetically attract and remove ferrous contaminants from the lubricant. With either of these or other suitable filter media, the filter medium 56 acts as a passive filter. That is, the filter medium traps contaminants as the lubricant flows over the filter medium 56. The lower flow velocity of the lubricant in the cavity 50a allows the filter medium 56 to trap solid particles more effectively than can be done if the medium is placed in the main cavity.

When a flow-over type filter is used as the filter medium 10, any suitable material can be used for the filter, such as an interwoven nylon strands. Of course, if a magnet is used as the filter medium 10, any suitable magnetic material can be employed as the magnet.

Additional cooling and/or filtering capabilities may be provided by the cavities. For example, an additional filter medium 58 (shown in phantom) may be placed in an upper cavity 50b, and fins, similar to the fins 54, may be placed on the outer wall of the lateral extension 30 surrounding the cavity 50a and, if desired, the cavity 50b. These fins 54 provide more surface area from which heat can be rejected from the inner cavity 50a. The outer cavities 50c, 50d may also be used for enhanced heat rejection. For instance, in some configurations, additional fins 59 for enhanced heat rejection may located within one or more of the outer cavities 50c, 50d, or a fluid-fluid heat exchanger might be placed in either or both outer cavities 50c, 50d.

In some embodiments, the inner cavity 50b may be located significantly above the level of the sump such that it receives no or only a small amount of fluid flow as the gears splash lubricant inside the housing 12. In such embodiments, the cavity 50b may be less useful for filtering and cooling than when the cavity is positioned closer to the sump. However, the cavity 50b can provide other benefits. For example, the cavity 50b may communicate with the exterior of the housing 12 through a vent 60 such that the cavity 50b forms a separation chamber, which allows air-suspended lubricant to settle out of the air before the air passes through the vent 60. Being relatively large and deep, the cavity 50b provides a relatively large volume into which the air-suspended lubricant flows.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A motor vehicle power transfer unit for distributing torque comprising:
   a non-parallel gear set and a parallel gear set; and
   a housing in which the non-parallel gear set and the parallel gear set reside, the housing including an extension portion and a casing, the extension portion including a transmission mounting interface and having a web structure defining at least one inner cavity, the at least one inner cavity being in fluid communication with the interior of the housing and located laterally of the parallel gear set and the non-parallel gear set, the outer surface of the extension portion being provided with cooling fins for removing heat from the housing.

2. The power transfer unit of claim 1 further comprising a filter medium positioned in the at least one inner cavity, the filter medium removing particulates in a lubricant which lubricates at least the non-parallel gear set and the parallel gear set.

3. The power transfer unit of claim 2 wherein the filter medium is a fabric filter.

4. The power transfer unit of claim 3 wherein the fabric is nylon.

5. The power transfer unit of claim 2 wherein the filter medium is a magnetic material which magnetically attracts particulates from the lubricant.

6. The power transfer unit of claim 1 wherein at least one cavity is located within a sump of the power transfer unit.

7. The power transfer unit of claim 1 wherein the extension portion is provided with a vent for ventilating the interior of the housing to the external atmosphere.

8. The power transfer unit of claim 1 wherein the web structure defines a second inner cavity, the second cavity defining a separation chamber which allows air-suspended lubricant to settle out of the air before the air passes through a vent defined in the extension portion to the exterior of the housing.

9. The power transfer unit of claim 1 wherein the web structure defines at least one outer cavity.

10. The power transfer unit of claim 9 wherein the at least one outer cavity is provided with a heat exchanger therein for removing heat from the housing.

11. The power transfer unit of claim 10 wherein the at least one outer cavity shares a common wall with the at least one inner cavity.

12. A motor vehicle power transfer unit for distributing torque, comprising:
    a non-parallel gear set; and
    a housing in which the non-parallel gear set reside, the housing including an extension portion and a casing, the extension portion including a transmission mounting interface and having a web structure defining at least one inner cavity, the at least one inner cavity being in fluid communication with the interior of the housing and located laterally of the non-parallel gear set, the extension portion further having a vent for ventilating the interior of the housing to the external atmosphere.

13. The power transfer unit of claim 12 wherein the non-parallel gear set includes at least one bevel gear.

14. The power transfer unit of claim 12 wherein the non-parallel gear set includes at least one hypoid gear.

15. The power transfer unit of claim 12 further comprising a filter medium positioned in the at least one inner cavity, the filter medium removing particulates in a lubricant which lubricates at least the non-parallel gear set and the parallel gear set.

16. The power transfer unit of claim 12 wherein the web structure defines a second inner cavity, the second cavity defining a separation chamber which allows air-suspended lubricant to settle out of the air before the air passes through a vent defined in the extension portion to the exterior of the housing.

17. The power transfer unit of claim 12 wherein the web structure defines at least one outer cavity.

* * * * *